US006983608B2

(12) United States Patent
Allen, Jr. et al.

(10) Patent No.: US 6,983,608 B2
(45) Date of Patent: Jan. 10, 2006

(54) METHODS AND APPARATUS FOR ASSEMBLING GAS TURBINE ENGINES

(75) Inventors: Clifford Edward Allen, Jr., Newbury, MA (US); Alan John Charlton, Boxford, MA (US)

(73) Assignee: General Electric Company, Schenectady, NY (US)

( * ) Notice: Subject to any disclaimer, the term of this patent is extended or adjusted under 35 U.S.C. 154(b) by 44 days.

(21) Appl. No.: 10/743,693

(22) Filed: Dec. 22, 2003

(65) Prior Publication Data

US 2005/0132715 A1 Jun. 23, 2005

(51) Int. Cl.
*F02C 7/20* (2006.01)

(52) U.S. Cl. .................................... 60/798; 29/890.01

(58) Field of Classification Search .................. 60/796, 60/798; 29/890.01, 889.2
See application file for complete search history.

(56) References Cited

U.S. PATENT DOCUMENTS

| | | | | |
|---|---|---|---|---|
| 4,793,770 | A | 12/1988 | Schonewald et al. | |
| 4,989,406 | A | 2/1991 | Vdoviak et al. | |
| 5,224,341 | A * | 7/1993 | Munroe et al. | 60/226.1 |
| 5,272,869 | A | 12/1993 | Dawson et al. | |
| 5,284,011 | A * | 2/1994 | Von Benken | 60/796 |
| 5,292,227 | A | 3/1994 | Czachor et al. | |
| 5,634,767 | A | 6/1997 | Dawson | |
| 6,193,141 | B1 * | 2/2001 | Burke et al. | 228/190 |

* cited by examiner

*Primary Examiner*—Ehud Gartenberg
(74) *Attorney, Agent, or Firm*—Armstrong Teasdale LLP; William Scott Andes

(57) ABSTRACT

A method facilitates assembling a gas turbine engine. The method comprises providing an engine frame including an integrally formed outer band, an inner band, and a plurality of circumferentially-spaced apart struts extending radially therebetween, and providing at least one fairing that is formed as an integral single piece casting and includes a first sidewall and a second sidewall connected at a leading edge and a trailing edge such that at least one cooling chamber is defined therebetween. The method also comprises coupling the at least one fairing around at least one strut such that the strut extends through the fairing at least one cooling chamber and such that during the coupling process the fairing is only transitioned axially around the strut rather being slid radially along the strut.

16 Claims, 5 Drawing Sheets

METHODS AND APPARATUS FOR ASSEMBLING GAS TURBINE ENGINES

STATEMENT REGARDING FEDERALLY SPONSORED RESEARCH & DEVELOPMENT

The government may have rights in this invention pursuant to government contract number N00019-01-C-0147.

BACKGROUND OF THE INVENTION

This invention relates generally to gas turbine engines and more particularly, to methods and apparatus for assembling gas turbine engines.

Known gas turbine engines include at least one rotor shaft supported by bearings which are in turn supported by annular frames. At least some known turbine frames include an annular casing that is spaced radially outwardly from an annular hub. A plurality of circumferentially-spaced apart struts extend between the annular casing and the hub. More specifically, within at least some known turbine engines, the struts, casing, and hub are integrally-formed together. In other known turbine engines, multi-piece frames are used in which only the struts and casing are integrally formed together.

Because at least some of the struts extend through a flow path defined within the engine, at least some of the struts are surrounded by, and extend through, a fairing that facilitates shielding the struts from hot combustion gases flowing through the flow path. More specifically, to facilitate increasing the structural integrity of fairings positioned in the flowpath, at least some known fairings are fabricated as a single-piece casting that includes at least one internal serpentine cooling passage. However, airflow and structural design requirements of such fairings may complicate the assembly of the struts to the engine frame. For example, because such fairings are unitary, the fairings may only be utilized with multi-piece frames. More specifically, each unitary strut is positioned around an inner end of each strut, slid radially outward towards a cantilevered end of each strut, and is coupled in position using a plurality of precisely-machined fastening/coupling hardware. Accordingly, because of the additional assembly and coupling hardware associated with multi-piece frames, and because of the tolerances that may be necessary to meet structural requirements, manufacturing and assembly costs of such frames may be more costly and time-consuming than associated with other known frames.

BRIEF DESCRIPTION OF THE INVENTION

In one aspect, a method for assembling a gas turbine engine is provided. The method comprises providing an engine frame including an integrally formed outer band, an inner band, and a plurality of circumferentially-spaced apart struts extending radially therebetween, and providing at least one fairing that is formed as an integral single piece casting and includes a first sidewall and a second sidewall connected at a leading edge and a trailing edge such that at least one cooling chamber is defined therebetween. The method also comprises coupling the at least one fairing around at least one strut such that the strut extends through the fairing at least one cooling chamber and such that during the coupling process the fairing is only transitioned axially around the strut rather being slid radially along the strut.

In another aspect, a fairing for use with a gas turbine frame strut is provided. The fairing is cast as an integral single piece and includes a first sidewall and a second sidewall connected together at a leading edge and a trailing edge such that at least one cooling chamber is defined therebetween. The fairing includes at least one partition and at least one parting line. The at least one partition is formed integrally with, and extends between, the first and second sidewalls. The at least one parting line divides the fairing into a forward portion and a separate aft portion that are removably coupled together.

In a further aspect, a gas turbine engine is provided. The engine includes an engine frame and at least one fairing. The engine frame includes an outer band, an inner band, and a plurality of circumferentially-spaced apart struts extending radially therebetween. The plurality of struts are formed integrally with the outer and inner bands. The at least one fairing is configured to be coupled around one of the plurality of struts such that a respective strut extends through the at least one fairing. The fairing is formed as an integral single piece and includes a first sidewall and a second sidewall connected together at a leading edge and a trailing edge such that at least one cooling chamber is defined therebetween. The fairing further includes at least one partition and at least one parting line. The at least one partition extends between the first and second sidewalls. The at least one parting line separates the fairing into a forward portion and a separate aft portion that are removably coupled together.

DETAILED DESCRIPTION OF THE INVENTION

Figure 1:
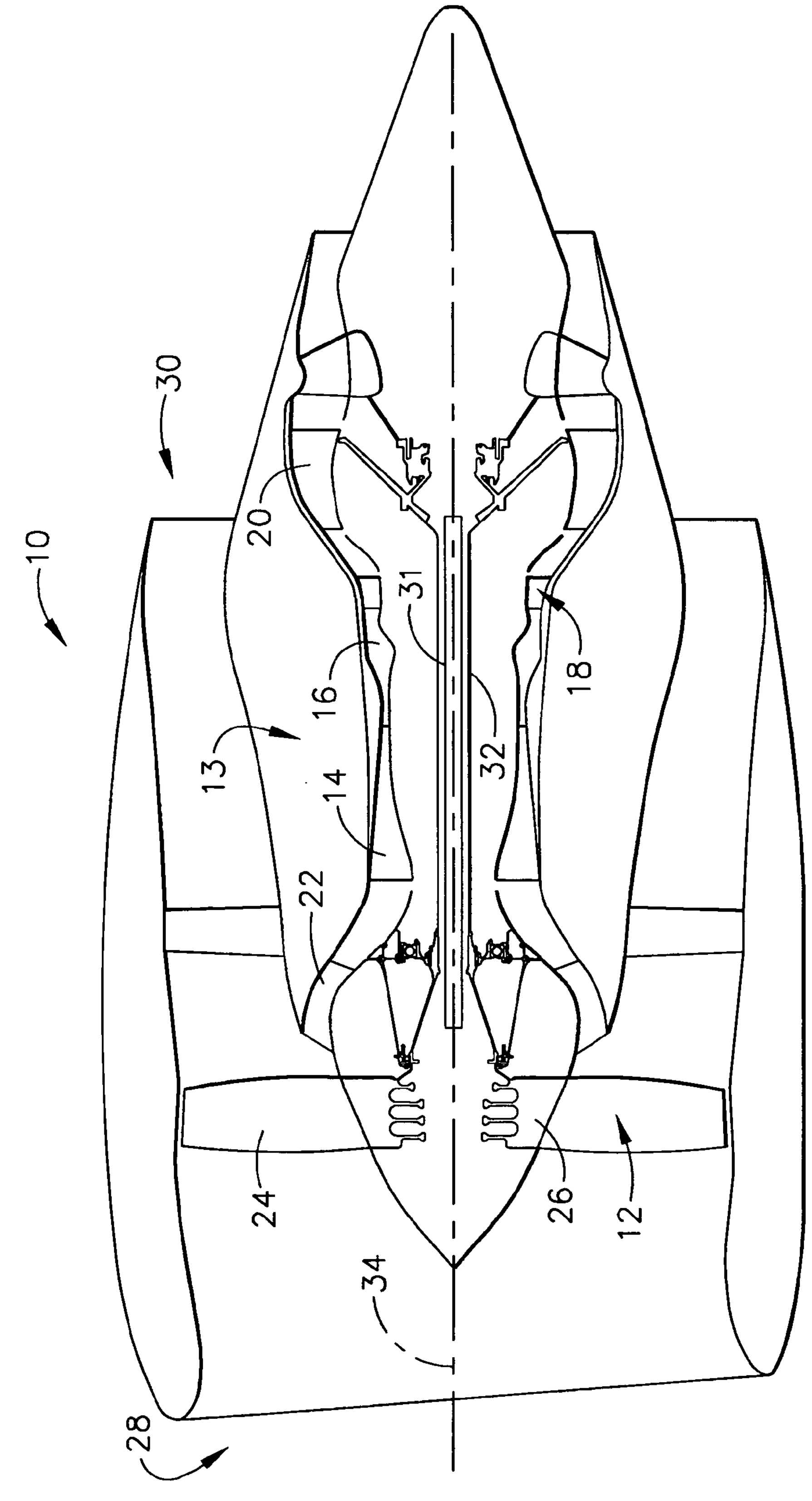
FIG. 1 is a schematic illustration of an exemplary gas turbine engine.

FIG. 1 is a schematic illustration of a gas turbine engine 10 including a fan assembly 12 and a core engine 13 including a high pressure compressor 14, and a combustor 16. Engine 10 also includes a high pressure turbine 18, a low pressure turbine 20, and a booster 22. Fan assembly 12 includes an array of fan blades 24 extending radially outward from a rotor disc 26. Engine 10 has an intake side 28 and an exhaust side 30. In one embodiment, the gas turbine engine is a GE90 available from General Electric Company, Cincinnati, Ohio. Fan assembly 12 and turbine 20 are coupled by a first rotor shaft 31, and compressor 14 and turbine 18 are coupled by a second rotor shaft 32.

During operation, air flows through fan assembly 12, in a direction that is substantially parallel to a central axis 34 extending through engine 10, and compressed air is supplied to high pressure compressor 14. The highly compressed air is delivered to combustor 16. Airflow (not shown in FIG. 1) from combustor 16 drives turbines 18 and 20, and turbine 20 drives fan assembly 12 by way of shaft 31.

Figure 2:
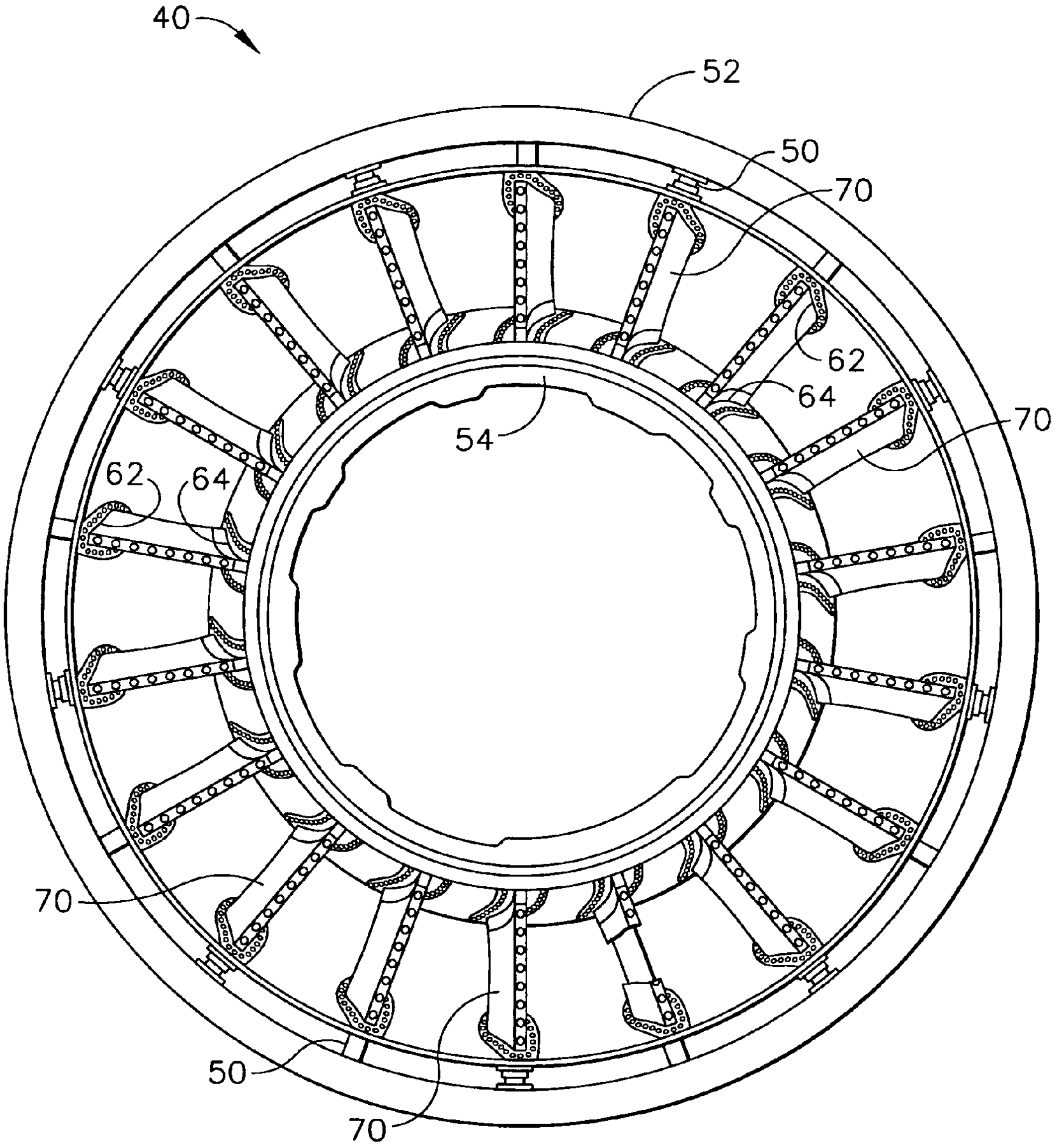
FIG. 2 is an aft-facing-forward view of an exemplary turbine frame that may be used with the turbine engine shown in FIG. 1.
Figure 3:
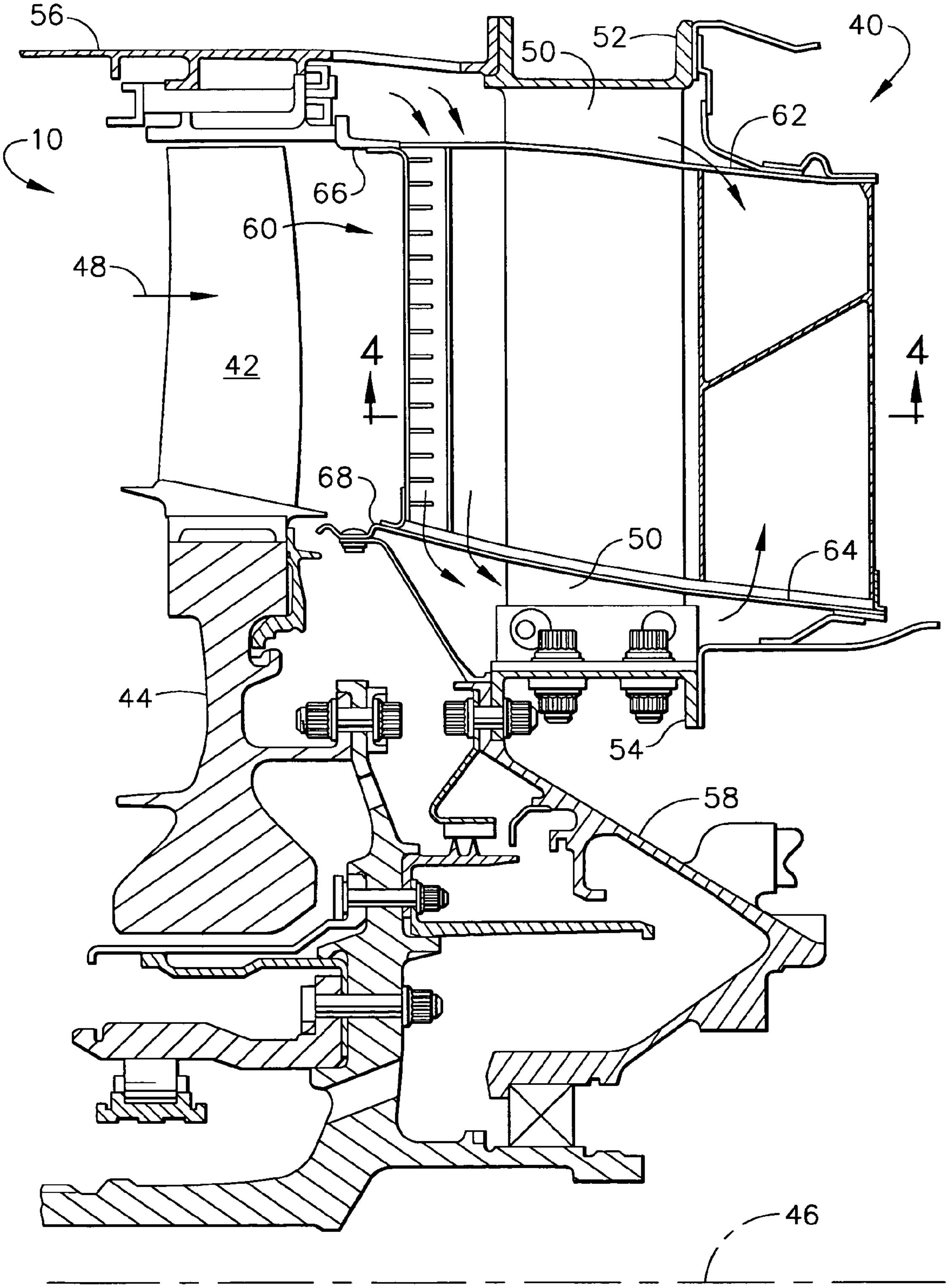
FIG. 3 is an partial cross-sectional side view of the turbine engine shown in FIG. 1 and including the turbine frame shown in FIG. 2.

FIG. 2 is an aft-facing-forward view of an exemplary turbine frame 40 that may be used with gas turbine engine 10. FIG. 3 is an partial exemplary cross-sectional side view of engine 10, including turbine frame 40. Engine 10 includes a row of rotor blades 42 coupled to a rotor disk 44. Frame 40 and disk 44 are positioned substantially co-axially about a longitudinal or axial centerline axis 46 extending through engine 10, and as such, are in flow communication with hot combustion gases 48 discharged from a combustor (not shown in FIG. 2 or 3), such as combustor 16.

Turbine frame 40 includes a plurality of circumferentially-spaced apart, and radially-extending support struts 50. Each strut 50 extends between a radially outer ring or band 52 and a radially inner hub or band 54. In the exemplary embodiment, frame 40 is cast integrally with struts 50 and bands 52 and 54. In the exemplary embodiment, outer band 52 is securely coupled to an annular casing 56 of engine 10, and inner band 54 is securely coupled to an annular bearing support 58. Struts 50 and bearing support 58 provide a relatively rigid assembly for transferring rotor loads induced during engine operation.

Each strut 50 extends through a fairing 60 which, as described in more detail below, facilitates shielding each strut 50 from combustion gases flowing through engine 10. In the exemplary embodiment, each fairing 60 is fabricated from a high temperature cast alloy. Moreover, cooling fluid is channeled into an internal cooling chamber (not shown in FIG. 2 or 3) defined within each strut 50 to facilitate reducing an operating temperature of each strut 50 and fairing 60.

Fairings 60 are coupled at respective radially outer and inner ends 62 and 64 to corresponding annular outer and inner liners 66 and 68. Liners 66 and 68 confine a flow of the combustion gases 48 therebetween, and are therefore correspondingly heated by combustion gases 48 during engine operation. Fairings 60 and liners 66 and 68 are supported by respective bands 52 and 54 to accommodate substantially unrestrained differential thermal movement therewith.

In the exemplary embodiment, turbine frame 40 also includes a plurality of vanes 70 coupled to, and extending between, outer and inner liners 66 and 68, respectively, such that each vane 70 is positioned between adjacent circumferentially-spaced fairings 60. Accordingly, in the exemplary embodiment, engine frame 40 includes nine fairings 60 and struts 50 spaced apart substantially uniformly around a perimeter of frame 40, and nine vanes 70 spaced substantially equally between each respective pair of circumferentially-spaced struts 50. Vanes 70 are substantially identical in configuration to fairings 60, except that no strut 50 extends radially therethrough. In an alternative embodiment, frame 40 does not include any vanes 70.

Figure 4:
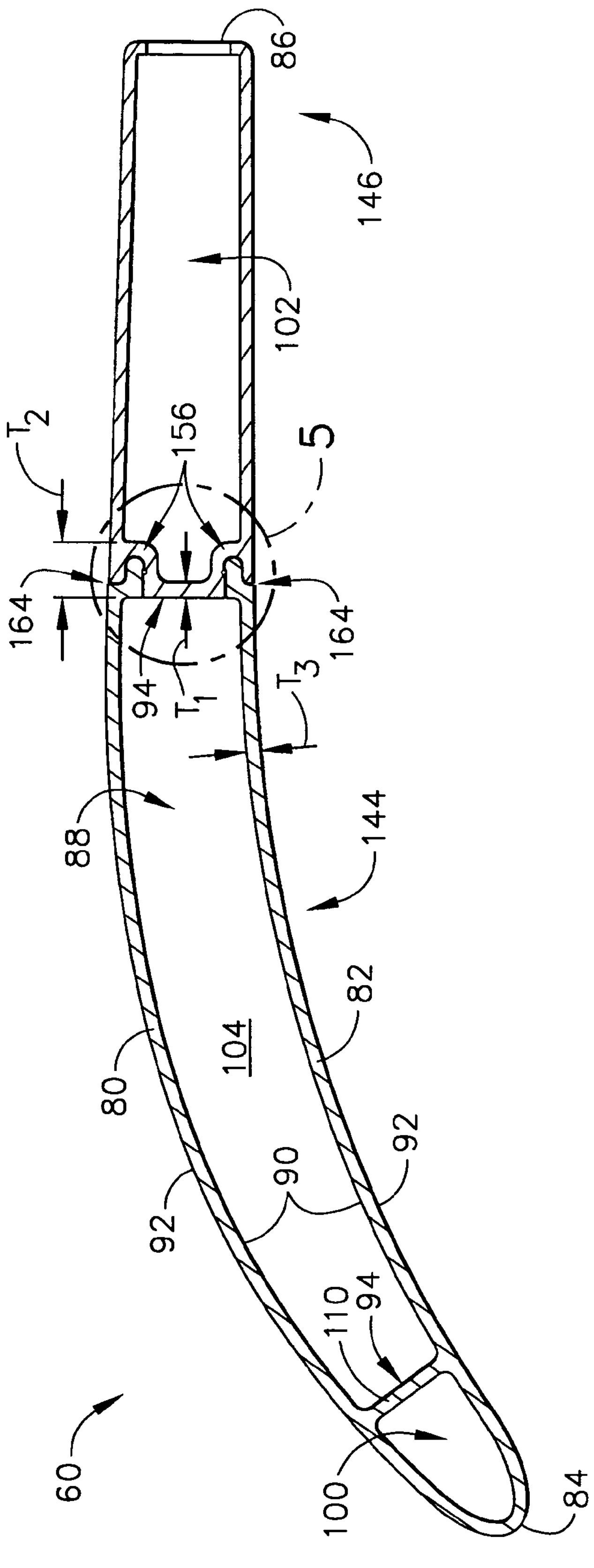
FIG. 4 is a cross-sectional view of an exemplary fairing that may be used with the turbine frame shown in FIG. 3.
Figure 5:
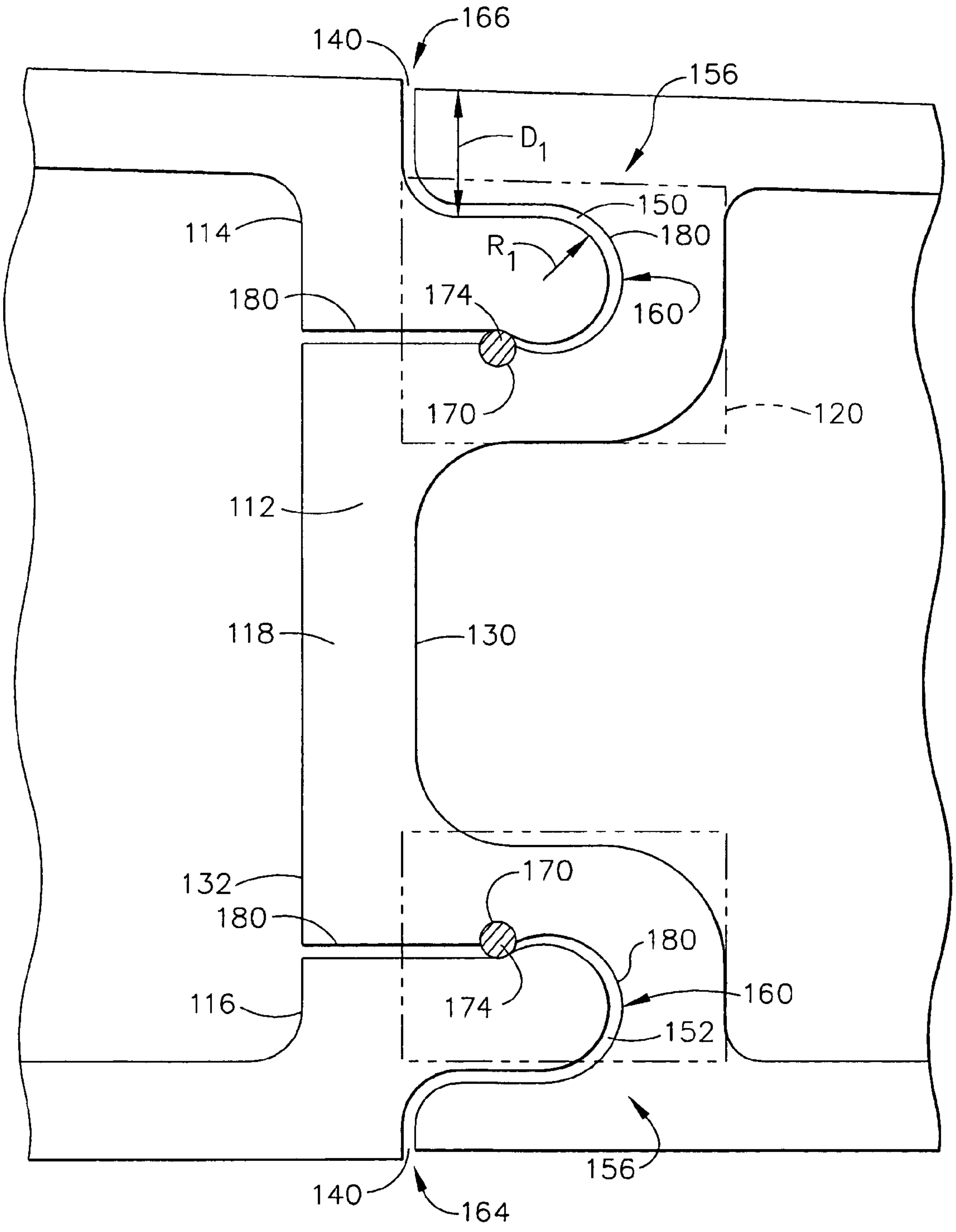
FIG. 5 is an enlarged view of a portion of the fairing shown in FIG. 4 and taken along area 5—5.

FIG. 4 is a cross-sectional view of fairing 60. FIG. 5 is an enlarged view of a portion of fairing 60 and taken along area 5—5. Each fairing 60 includes a first sidewall 80 and a second sidewall 82 that is spaced apart from first sidewall 80. First sidewall 80 extends longitudinally between fairing ends 62 and 64 (shown in FIGS. 2 and 3) and defines a pressure side of fairing 60. Second sidewall 82 also extends longitudinally between fairing ends 62 and 64 and defines a suction side of fairing 60. Sidewalls 80 and 82 are joined at a leading edge 84 and at an axially-spaced trailing edge 86 of fairing 60, such that a cooling chamber 88 is defined within fairing 60. More specifically, each sidewall 80 and 82 has an inner surface 90 and an opposite outer surface 92. Outer surface 92 defines a gas flowpath surface. Cooling chamber 88 is defined by inner surface 90 and is bounded between sidewalls 80 and 82.

In the exemplary embodiment, cooling chamber 88 includes a plurality of inner ribs or partitions 94 which partition cooling cavity 88 into a plurality of cooling chambers 88. Specifically, in the exemplary embodiment, fairing 60 is a single piece casting that is formed integrally with sidewalls 80 and 82, and inner walls 94. More specifically, airfoil 42 includes a leading edge cooling chamber 100, a trailing edge cooling chamber 102, and at least one intermediate cooling chamber 104. In one embodiment, leading edge cooling chamber 100 is in flow communication with trailing edge and intermediate cooling chambers 102 and 104, respectively. In the exemplary embodiment, at least a portion of chambers 88 is configured as a serpentine cooling passageway.

Leading edge cooling chamber 100 extends longitudinally or radially through fairing 60, and is bordered by sidewalls 80 and 82, and by fairing leading edge 84. Each intermediate cooling chamber 104 is between leading edge cooling chamber 100 and trailing edge cooling chamber 102, and is bordered by bordered by sidewalls 80 and 82 and by a leading edge partition 110 and an intermediate partition 112. In the exemplary embodiment, intermediate partition 112 is slightly aft of a mid-chord (not shown) of fairing 60. Trailing edge cooling chamber 102 extends longitudinally or radially through fairing 60, and is bordered by sidewalls 80 and 82, and by fairing trailing edge 86.

Leading edge partition 110 and intermediate partition 112 extend between sidewalls 80 and 82. More specifically, intermediate partition 112 is formed integrally with a pair of outer end portions 114 and 116, and a body portion 118 extending therebetween. In the exemplary embodiment, a thickness $T_1$ of body portion 118 is substantially constant between ends 114 and 116, and each end 114 and 116 has a thickness $T_2$ that is thicker than body thickness $T_1$. In one embodiment, end thickness $T_2$ is created by the coupling additional material 120 to partition 112 through a known process, such as, but not limited to a known welding process. In another embodiment, partition thickness $T_2$ is formed integrally with partition 112 during the casting process. More specifically, in such a process, material 120 may be coupled to an existing fairing partition to modify the existing engine fairing, or alternatively, may be cast as an integral portion of a partition during fabrication of the engine frame fairing.

Moreover, although ends 114 and 116 are illustrated as having a generally rectangular cross-sectional profile, it should be noted that ends 114 and 116 are not limited to having a generally rectangular cross-sectional profile. For example, in another embodiment, ends 114 and 116 are chamfered and have a generally triangular cross-sectional profile.

In the exemplary embodiment, additional material 120 is added only to an aft side 130 of partition 112 adjacent ends 114 and 116, such that material 120 extends from partition 118 and from sidewall inner surfaces 90. In an alternative embodiment, additional material 120 is added to a forward side 132 of partition 112 adjacent ends 114 and 116. In a further alternative embodiment, additional material 120 is added to respective forward and/or aft sides 132 and 130 of partition 112 adjacent ends 114 and 116. In one embodiment, partition 118 does not extend fully longitudinally through fairing 60 between fairing ends 62 and 64, but additional material 120 is added longitudinally through fairing 60 and along sidewall inner surface 90, such that a cross-sectional profile of material 120 is substantially constant longitudinally through fairing 60 between ends 62 and 64.

Fairing 60 is also formed with a parting line 140 such that a two-piece fairing is produced from a single casting which, as described in more detail below, facilitates coupling fairing 60 around each respective strut 50. Specifically, parting line 140 extends from sidewall 80 to sidewall 82 through intermediate cooling chamber 104, and divides fairing 60 into a forward portion 144 and an aft portion 146. More specifically, part line 140 extends through intermediate cooling chamber 104 immediately upstream from intermediate partition 112.

In the exemplary embodiment, parting line 104 includes a pair of cut lines 150 and 152 that are mirrored-images of each other. Specifically, cut line 150 extends between sidewall inner and outer surfaces 90 and 92, respectively, through sidewall 80, and similarly, cut line 152 extends between sidewall inner and outer surfaces 90 and 92, respectively, through sidewall 82. More specifically, in the exemplary embodiment, each cut line 150 and 152 extends at least partially through additional material 120.

In the exemplary embodiment, each cut line 150 and 152 defines a tongue and groove joint configuration 156 that facilitates coupling faring forward and aft portions 144 and 146, respectively. In alternative embodiments, forward and aft portions 144 and 146 are coupled together using other joint configurations. Moreover, in another alternative embodiment, cut lines 150 and 152 are not mirrored images of each other.

In the exemplary embodiment, each cut line 150 and 152 extends radially inward from sidewall outer surface 92 at a location that is approximately centered with respect to each respective intermediate partition end 114 and 116. More specifically, in the exemplary embodiment, each cut line 150 and 152 extends radially inward for a distance $D_1$ that is approximately equal to a thickness $T_3$ of each sidewall 80 and 82. Each cut line 150 and 152 then extends aftward in a predetermined radius of curvature $R_1$ such that a semi-circular portion 160 is defined within partition material 120. Each cut line 150 and 152 is then extended generally axially through partition 112 to partition forward side 132. Accordingly, each cut line 150 and 152 defines a respective aft-facing step 164 and 166 along each gas flowpath surface 92.

A retaining groove 170 is formed within each cut line 150 and 152 between each semi-circular portion 160 and partition forward side 132. Each groove 170, as described in ore detail below, is offset with respect to each cut line 150 and 152 to facilitate sealing along parting line 140 when fairing portions 144 and 146 are coupled together. Moreover, because each groove 170 is offset with respect to each cut line 150 and 152, parting line 140 is divided into four sealing locations 180 spaced along line 140.

During fabrication of fairings 60, initially each fairing 60 is cast as an integrally-formed single casting. Parting line 140 is then formed within fairing 60. Specifically, in the exemplary embodiment, each cut line 150 and 152 is formed via a primary electrical discharge machining (EDM) wire, and a secondary EDM wire is used to create grooves 170. In addition to creating sealing locations 180, offsetting grooves 170 with respect to each cut line 150 and 152 also facilitates compensating for wire EDM kerf. Each groove 170 is sized to receive a locking wire 174 therein which facilitates sealing between fairing portions 144 and 146.

Accordingly, when parting line 140 has been formed, each fairing 60 may be coupled around each strut 50 in an axial direction rather than having to be slid radially outward from a cantilevered end of each strut 50. More specifically, parting line 140 creates a two-piece fairing 60 that may be coupled to an integrally-formed, one-piece frame 40 such that multi-piece frame structures are not necessary. Specifically, once parting line 140 is created, fairing forward portion 144 is removably coupled to fairing aft portion 146. Accordingly, during assembly, fairing aft portion 146 may be positioned relative to a respective strut 50 to be shielded, and such that a locking wire 174 is positioned within each sealing groove 170. Fairing forward portion 144 is then axially coupled to aft portion 146 to complete the installation of fairing 60 such that strut 50 is shielded therein. Each locking wire 174 facilitates sealing between fairing portions 144 and 140 such that fluid leakage through each joint 156 is facilitated to be reduced.

Accordingly, assembly costs and times are facilitated to be reduced in comparison to those associated with multi-piece frame assemblies. Moreover, parting line 140 also enables high temperature cast alloy materials to be used to form fairings 60 without requiring more expensive multi-piece frame assemblies.

Moreover, fairing 60 is also reusable in that it is removable from one strut 50 and can be easily assembled on another strut 50. Because forward and aft fairing portions 140 and 144 can assemble axially around each strut 50, fairing 60 not only facilitates eliminating multi-piece frame structures, but also eliminates locking mechanisms and/or coupling hardware that is used with multi-piece frame assemblies. Accordingly, incorporating fairings 60 facilitate reducing design efforts from both a cost and cycle basis, along with hardware manufacturing and development cycles.

The above-described engine frame fairings are cost-effective and highly reliable. Each fairing is coupled axially around an integrally formed, one-piece engine frame. Accordingly, expensive coupling hardware associated with multi-piece engine frames is eliminated. Moreover, existing fairings may be modified for use as described herein. As a result, a fairing design is provided that facilitates minimizing the design efforts associated with both a cost-cycle basis, along with coupling hardware and manufacturing development cycles.

Exemplary embodiments of an engine frame, are described above in detail. The engine frames illustrated are not limited to the specific embodiments described herein, but rather, the fairings described herein may be utilized independently and separately from the gas turbine engine frames described herein.

While the invention has been described in terms of various specific embodiments, those skilled in the art will recognize that the invention can be practiced with modification within the spirit and scope of the claims.

What is claimed is:

1. A method for assembling a gas turbine engine, said method comprising:

providing an engine frame including an integrally formed outer band, an inner band, and a plurality of circumferentially-spaced apart struts extending radially therebetween;

providing at least one fairing that is formed as an integral single piece casting and includes a first sidewall and a second sidewall connected at a leading edge and a trailing edge such that at least one cooling chamber is defined therebetween; and coupling the at least one fairing around at least one strut such that the strut extends through the fairing said at least one cooling chamber and such that during the coupling process the fairing is only transitioned axially around the strut rather than being slid radially along the strut;

wherein said providing at least one fairing comprises forming a parting line extending through the fairing between the fairing first and second sidewalls such that the fairing is divided into a forward fairing portion and an aft fairing portion that are axially removable and coupled together.

2. A method in accordance with claim 1 wherein the fairing also includes at least one partition extending across the cooling chamber, wherein the partition includes a body and a pair of opposing ends that extend from an inner surface of each of the fairing sidewalls, the body extends between the opposing ends and has a first thickness measured between a forward side and an aft side of the body that is smaller than a second thickness of each of the opposed ends, said forming a parting line extending through the fairing between the fairing first and second sidewalls further comprises defining at least a portion of the parting line within the partition opposing ends.

3. A method in accordance with claim 1 further comprising forming at least one retainer groove that is offset from, and is in contact with said parting line.

4. A method in accordance with claim 1 further comprising positioning at least one sealing wire between the fairing forward and aft portions to facilitate enhancing sealing between the fairing forward and aft portions.

5. A fairing used with a gas turbine frame strut, said fairing cast as an integral single piece comprising a first sidewall and a second sidewall connected together at a leading edge and a trailing edge such that at least one cooling chamber is defined therebetween, said fairing comprising at least one partition and at least one parting line, said at least one partition formed integrally with, and extending between, said first and second sidewalls, said at least one parting line dividing said fairing into a forward portion and a separate aft portion that are axially removable and coupled together;

wherein said parting line is defined as a tongue and groove joint within at least a portion of said least one partition.

6. A fairing in accordance with claim 5 wherein said at least one partition comprises a body and a pair of opposing ends extending from an inner surface of each of said fairing sidewalls, said body extending between said opposing ends and having a first thickness measured between a forward side and an aft side of said body, each of said opposing ends having a second thickness measured between a forward side and an aft side of each said end, said second thickness is different than said first thickness.

7. A fairing in accordance with claim 6 wherein each said end second thickness is thicker than said body first thickness.

8. A fairing in accordance with claim 6 wherein said parting line extends at least partially through each of said opposing ends.

9. A fairing in accordance with claim 5 wherein said fairing is configured to couple axially around a strut such that said strut is at least partially contained within said fairing at least one cooling chamber.

10. A fairing in accordance with claim 5 wherein said parting line further comprises at least one retainer groove, said retainer groove offset from said parting line to facilitate enhancing sealing between said fairing forward and aft portions.

11. A fairing in accordance with claim 5 further comprising at least one sealing wire positioned between said fairing forward and aft portions, said sealing wire facilitates enhancing sealing between said fairing forward and aft portions.

12. A gas turbine engine comprising:

an engine frame comprising an outer band, an inner band, and a plurality of circumferentially-spaced apart struts extending radially therebetween, said plurality of struts formed integrally with said outer and inner bands; and at least one fairing coupled around one of said plurality of struts such that a respective strut extends through said at least one fairing, said fairing formed as an integral single piece and comprising a first sidewall and a second sidewall connected together at a leading edge and a trailing edge such that at least one cooling chamber is defined therebetween, said fairing further comprising at least one partition and at least one parting line, said at least one partition extending between said first and second sidewalls, said at least one parting line separating said fairing into a forward portion and a separate aft portion that are axially removable and coupled together;

wherein said at least one parting line extends at least partially through each of said fairing partition opposing ends, such that a coupling joint is at least partially defined within each of said opposing ends, said parting line being defined by a tongue and groove joint.

13. A gas turbine engine in accordance with claim 12 wherein said engine frame outer and inner bands define respective outer boundaries of a gas flowpath extending through said engine frame, said fairing is configured to facilitate shielding said strut from gases flowing through said flowpath.

14. A gas turbine engine in accordance with claim 12 wherein said fairing at least one partition comprises a body and a pair of opposing ends extending from an inner surface of each of said fairing sidewalls, said body extending between said opposing ends and having a first thickness measured between a forward side and an aft side of said body, each of said opposing ends having a second thickness measured between a forward side and an aft side of each said end, said second thickness is thicker than said first thickness.

15. A gas turbine engine in accordance with claim 12 wherein said fairing at least one parting line further comprises at least one retainer groove, said retainer groove offset from a remainder of said parting line, said at least one retainer groove facilitates enhancing sealing between said fairing forward and aft portions.

16. A gas turbine engine in accordance with claim 12 wherein said fairing further comprises at least one sealing wire positioned between said fairing forward and aft portions, said sealing wire facilitates enhancing sealing between said fairing forward and aft portions.

* * * * *